United States Patent [19]
Botsaris et al.

[11] Patent Number: 5,966,966
[45] Date of Patent: Oct. 19, 1999

[54] PROCESS AND SYSTEM FOR FREEZE CONCENTRATION USING ULTRASONIC NUCLEATION USEFUL IN EFFLUENT PROCESSING

[75] Inventors: Gregory D. Botsaris, Chelmsford; Ru-Ying Qian, Boston, both of Mass.

[73] Assignee: Trustees of Tufts College, Medford, Mass.

[21] Appl. No.: 09/082,169

[22] Filed: May 20, 1998

Related U.S. Application Data

[60] Provisional application No. 60/047,294, May 21, 1997.

[51] Int. Cl.[6] ................................................ B01D 9/04
[52] U.S. Cl. .............................................. 62/538; 210/748
[58] Field of Search ................................ 62/538; 210/748

[56] References Cited

U.S. PATENT DOCUMENTS

| | | | |
|---|---|---|---|
| 4,052,441 | 10/1977 | Brunner | 560/179 |
| 4,162,617 | 7/1979 | Schmidt et al. | 62/538 |
| 4,178,776 | 12/1979 | Bazdus et al. | 62/538 |
| 4,254,283 | 3/1981 | Mock | 562/530 |
| 4,400,189 | 8/1983 | Arkenbout et al. | 62/538 |
| 4,650,507 | 3/1987 | Cheng et al. | 62/12 |
| 4,867,817 | 9/1989 | Kneafsey et al. | 156/73.1 |
| 5,090,965 | 2/1992 | Kehm et al. | 62/538 |
| 5,471,001 | 11/1995 | Anderson et al. | 562/593 |

OTHER PUBLICATIONS

Ul Haq, Ehsan, and White, David A., "Freeze Decontamination Process: Modeling in a Simplified Case of Completely Mixed Aqueous Phase and Observations with Ultrasonic Agitation in the Liquid during Freezing," *Separation Science and Technology*, 30(5): 719–730 (1995).

Ul Haq, E., White, D.A., and Adeleye, S.A., "Freezing in an ultrasonic bath as a method for the decontamination of aqueous effluents", *The Chemical Engineering Journal*, 57: 53–60 (1995).

J.L. Walker, "Grain Refinement by Vibration," Phases and Processes. Journal of Metals, vol. 13, p. 379 (May, 1961).

Egon A. Hiedemann, "Metallurgical Effects of Ultrasonic Waves," The Journal of the Acoustical Society of America, vol. 26, No. 5, Sep., 1954, pp. 831–842.

Robert Smith–Johannsen, "Some Experiments in the Freezing of Water," Science, vol. 108, Dec. 10, 1948, pp. 652–654.

David P. Stuhr, "A Study of Energy–Induced Nucleation in Supercooled Bismuth," Thesis submitted to Faculty of Department of Materials Engineering in Partial Fulfillment of Requirements for Degree of Master of Metallurgy, Rensselaer Polytechnic Institute, Troy, New York, Aug., 1962.

(List continued on next page.)

*Primary Examiner*—Ronald Capossela
*Attorney, Agent, or Firm*—Hamilton, Brook, Smith & Reynolds, P.C.

[57] ABSTRACT

A freeze concentration method separates the nucleation and the growth processes at least to the extent necessary to enable nucleation and crystal growth to occur at different temperatures. Nucleation, however, is triggered by a sonicator, i.e., ultrasonic radiation. This provides excellent control of the process since the variables of the input sonic energy are adjusted easily. Most importantly, the use of ultrasound permits nucleation at low supercooling. The consequences of this are: an inexpensive plain—as opposed to the more complex and expensive scraped-surface—heat exchanger can be used since the coolant temperature is only slightly lower than that of the solution, preventing ice scaling in the heat exchanger; the higher coolant temperature leads to savings also in the operation costs. In addition ultrasonic nucleators are easily scaled-up to treating the large-volume effluents from industrial plants. The only way to scale-up scraped-surface nucleators is by using multiple nucleators in parallel.

23 Claims, 2 Drawing Sheets

OTHER PUBLICATIONS

D.R. Kelly, et al., "Rapid Crystallization Using Ultrasonic Irradiation –Sonocrystallisation," Tetrahedron Letter 34 (16), pp. 2689–2690, 1993.

C.F. Turner, Andrew Van Hook, "The Effect of Ultrasonic Irradiation on the Formation of Colloidal Sulfur and Ice," Journal of Colloid Science, vol. 5, No. 4, pp. 315–316 (1950).

Y. Murata, et al., "Effect of Ultrasonic Waves on Crystal Growth," Journal of Crystal Growth, 62, pp. 458–464 (1983).

V.V. Yaminskii, et al., "Effect of Ultrasound on Nucleation and Coagulation in Crystallization from Solution," Colloid Journal of USSR, vol. 53, No. 1, pp. 83–86, translated from Kolloidnyi Zhurnal, vol. 53, No. 1, pp. 100–104, Jan.–Feb. 1991.

PROCESS AND SYSTEM FOR FREEZE CONCENTRATION USING ULTRASONIC NUCLEATION USEFUL IN EFFLUENT PROCESSING

RELATED APPLICATION

This application claims the benefit of U.S. Provisional Application No. 60/047,294, filed on May 21, 1997, the entire teachings of which are incorporated herein, by this reference, in their entirety.

GOVERNMENT SUPPORT

The invention was supported, in whole or in part, by a grant R819679-01-0 from the Environmental Protection Agency. The Government has certain rights in the invention.

BACKGROUND OF THE INVENTION

In recent years, tightening of the effluent regulations and increasing community concerns have provided the motivation for further reductions in contaminants, especially the toxic organic chlorinated compounds such as those found in the effluents of pulp and paper mills. As a result, some mechanical process pulp mills are employing zero-discharge technology, while paper mills in Sweden have switched their bleach technology from chlorine-based to a total chlorine-free (TCF) processes.

In the United States, however, most pulp mills are utilizing the Kraft process, which results in effluent volumes being several times higher. In addition, due to the stronger market demand for the high quality paper from the elemental chlorine-free (ECF) process and its lower cost, most of the mills in the U.S. prefer ECF over TCF and a minimum-discharge over a zero-discharge process.

Efforts have been made to improve the $ClO_2$ bleaching sequence and have succeeded in reducing the TCDD (2, 3, 7, 8-tetrachloro-dibenzo-p-dioxin) in the effluents below its detectable limit (10 parts per quadrillion) and the AOX (adsorbable organic halogens) from 1.5 to 0.3 kg/ton pulp. However, the effect of these reductions on the environment remains uncertain because of the wide differences in toxicity in the hundreds AOX compounds and the extreme toxicity of dioxin. New EPA regulations of 0.272 kg/ton pulp on AOX that will be in effect in 1998, the expected imposition of new and tighter regulations requiring 0.05 kg/ton in fifteen years for AOX in the ECF process due to new toxicological findings, and the competition from the TCF process, necessitates significant reductions of AOX, of specific chlorophenols, and of furans in the effluents from mills employing $ClO_2$ bleaching.

The traditional technology of wastewater treatment involves evaporation for volume reduction and subsequent biotreatment with a recovery boiler for the destruction of the contaminants. However, this technology is not very efficient for the AOX reduction. Actually, the achieved reduction of AOX to 0.3 kg/ton pulp by the improvement of ECF sequence is close to the limit of the process capability.

AOX is a wide spectrum of organic chlorinated compounds. Many of the compounds are either poorly- or non-biodegradable. The efficiency of AOX removal by biotreatment was found to be 40–50% for effluents from a $ClO_2$ bleaching unit of a mill. There are reports of 23 to 70% removal of AOX by biotreatment from bleach effluents of mills. It should be also noted that many of these compounds are volatile. In a distillation, AOX will leave with the distillate even if only 10 to 20% is evaporated in a batch experiment. Actually when 90% of the effluent volume is distilled, only half of the AOX remained in the still. Continuous distillation experiments showed that only a third of AOX remained in the bottom product. The actual AOX concentration in distillates from 0–10% up to 80–90% of the effluent volume remained close to a constant value. These results predicted the poor separation of distillate from AOX in the evaporators, which concentrate the bleaching effluent from 0.2–0.3% to 15% by solute weight, and the concentrators, which concentrate it from 15% to 45%.

In other industries, freeze concentration has been used to effectively keep the volatile solute in the concentrate. The concentration of aqueous solutions by freezing the solution and removing the resulting ice has been studied extensively. Generally, however, freeze concentration of fruit juices, like orange and apple juice, and of coffee are the only commercialized industrial processes. These are relatively small volume processes.

The application of freeze concentration to large volume processes such as the desalination of sea water or the waste water or toxic effluents treatment is hindered by technical problems such as the formation of ice scaling on the cooling surface and the plugging of the tubes of the heat exchanger, entrapment of concentrate in the produced ice, and the high refrigeration cost.

The NIRO process, used currently for fruit juice concentration, has solved the technical problems by decoupling the nucleation and the growth processes for ice crystals and controlling them separately. The formation of ice nuclei (nucleation) takes place on the cooling surface of an expensive scraped-surface heat exchanger (VOTATOR). The ice nuclei are then transferred to a crystallizer where they grow.

SUMMARY OF THE INVENTION

The problem with the NIRO process, however, is that it does not scale well to the large volumes required for industrial effluent processing such as required for paper mills, for example. The scraped-surface heat exchanger is expensive, generally, and its size is limited by the mechanics required for the ice scraping, e.g., 0.5 ton ice per hour. The high capital and operation costs make this process unsuitable for large-volume operations such as the treatment of waste water effluents.

According to the invention, the nucleation and the growth processes are separated as in the NIRO process, at least to the extent necessary to enable nucleation and crystal growth to occur at different temperatures. Nucleation, however, is triggered by a sonicator, i.e., ultrasonic radiation. This provides excellent control of the process since the variables of the input sonic energy are controllable. Most importantly, the use of ultrasound permits nucleation at low levels of supercooling, much lower than that used in the NIRO process. The consequences of this are: an inexpensive plain heat exchanger can be used since the coolant temperature is only slightly lower than that of the solution, minimizing ice scaling in the heat exchange; the higher coolant temperature leads to savings in the capital and operation costs of refrigeration; and by using indirect cooling of the solution as opposed to direct cooling by primary or secondary coolant, better quality crystals are obtained due to the use of lower supercooling.

In general, according to one aspect, the invention features a method of freeze concentration. This method comprises super-cooling a liquid and then irradiating the supercooled liquid with ultrasonic energy in a nucleator. The liquid with the nucleated ice crystals is then transferred from the nucleator to a crystallizer to allow growth of the crystals to the desired size. Subsequently, the ice is separated from the mother liquor.

In the preferred embodiment, the liquid is preferably industrial effluent from a paper mill, and specifically a paper bleaching process. According to the invention, low levels of supercooling are used in the nucleator. Preferably, supercooling of less than 3° C. and preferably 0.3 to 0.7° C. are used. These low levels of supercooling, relative to supercooling in other processes such as NIRO which are estimated to be greater than 3° C., prevent any ice scaling and thus avoid a requirement for a scraped-ice nucleator. This lead to two benefits. First, the expensive mechanics of the ice-scaping are no longer needed, and secondly the process can be scaled to handle the volumes required for waste treatment. Scraped-ice nucleators are generally limited to processes handling less than 0.5 tons per hour. The only way to increase throughput in scraped-ice nucleators is to place multiple nucleators in parallel, which is extremely costly, rendering this solution generally inapplicable for industrial waste processing applications.

Further, in order to prevent ice scaling in the crystallizer, and promote large ice crystal formation, the nucleator has a controlled residence time. This allows nuclei to form into fine ice crystals.

In the preferred embodiment, the crystallizer is preferably of a forced circulation cooling type. Crystal growth occurs at preferably low levels of supercooling, between 0.1 and 0.4° C. A slurry is drawn out of the crystallizer for separation and washing.

In general, according to another aspect, the invention again features a method of freeze concentration. A liquid is supercooled and then ultrasonically irradiated to initiate nucleation. Growth of the nucleated ice crystals is then performed at lower supercooling than at which the nucleation occurred.

Finally, according to still another aspect, the invention features a system for freeze concentration. The system comprises a cooling unit for supercooling a liquid. A ultrasonic nucleator is then used to induce nucleation. A crystallizer then receives the nucleated liquid where the growth of crystals occurs. A separation device then isolates frozen particles in the liquid from the crystallizer.

The above and other features of the invention including various novel details of construction and combinations of parts, and other advantages, will now be more particularly described with reference to the accompanying drawings and pointed out in the claims. It will be understood that the particular method and device embodying the invention are shown by way of illustration and not as a limitation of the invention. The principles and features of this invention may be employed in various and numerous embodiments without departing from the scope of the invention.

BRIEF DESCRIPTION OF THE DRAWINGS

In the drawings, like reference characters refer to the same parts throughout the different views. The drawings are not necessarily to scale, emphasis instead being placed upon illustrating the principles of the invention. Of the drawings.

DETAILED DESCRIPTION OF THE PREFERRED EMBODIMENTS

Figure 1:
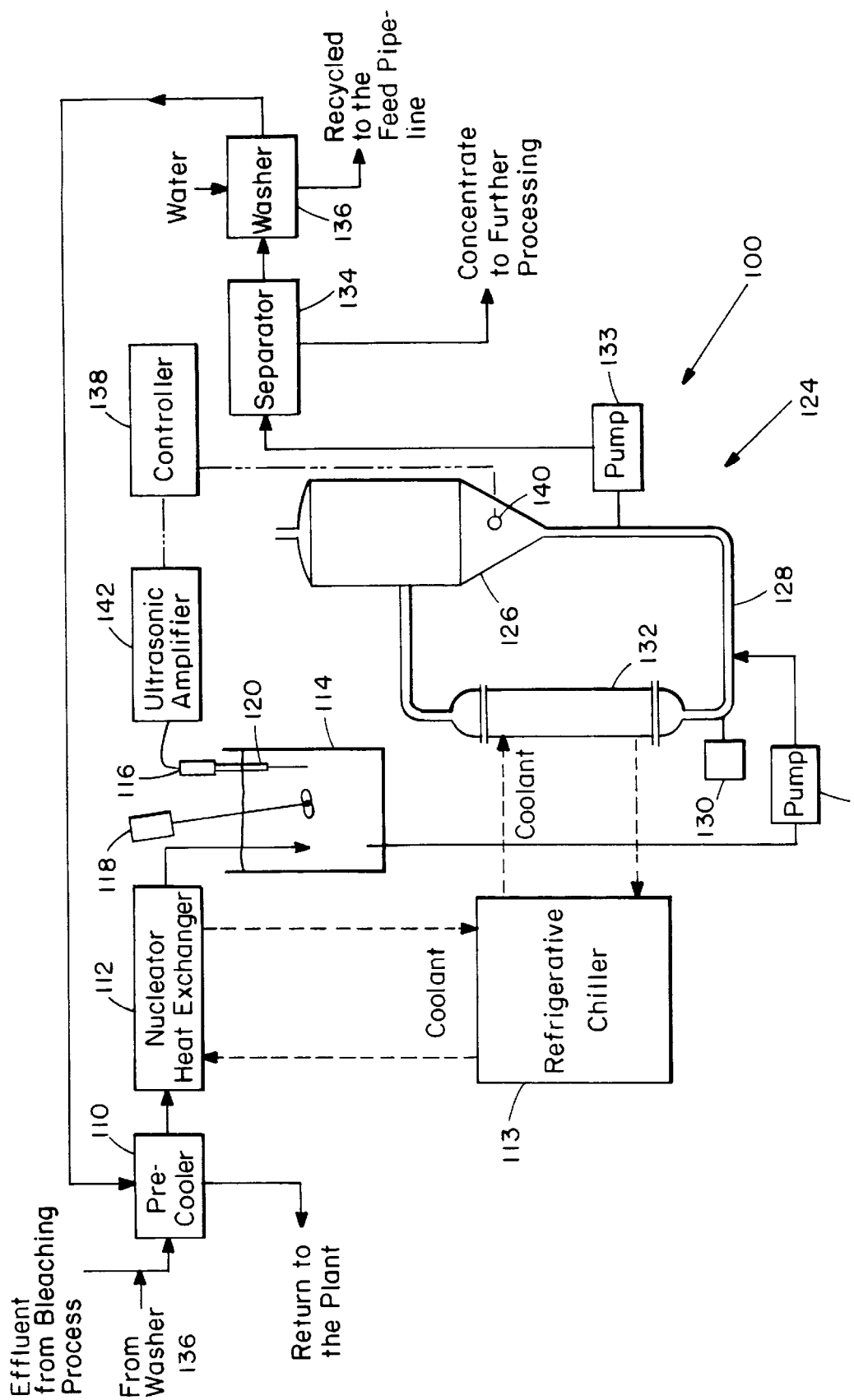
FIG. 1 is a schematic diagram illustrating a freeze concentration process according to the present invention.

FIG. 1 shows a freeze concentration system 100 using ultrasound nucleation, which has been constructed according to the principles of the present invention.

Fluid from a process, such as effluent from a paper bleaching process in a Kraft paper mill, is cooled in pre-cooler 110. This lowers its temperature to near its freezing point.

The fluid then passes to a nucleator heat exchanger 112. In the preferred embodiment, the liquid is preferably supercooled between 0.2 and 1.6° Celsius (C), i.e., below the freezing point of the fluid. This range is valid for most aqueous solutions. In the preferred embodiment, however, the supercooling is in fact much less, between 0.3 and 0.7° C.

The nucleator heat exchanger 112 receives coolant from refrigerative chillers 113. In the preferred embodiment, the coolant in the exchanger is relatively warm, less than 3° C. below the liquid's melting point to prevent ice scaling.

The supercooled liquid from the nucleator heat exchanger 112 is passed to the nucleator 114. Since the supercooling is preferably kept to a minimum, generally, nucleation will not occur spontaneously. According to the invention, an ultrasonic generator 116 is used to irradiate the supercooled liquid in the nucleator 114 with ultrasonic energy to trigger nucleation.

Ultrasonic amplifier 142 preferably drives the generator 116 in bursts of less than one minute and at intervals determined by controller 138. The frequency of the ultrasonic radiation is approximately 20 k to 23 k Hertz.

In the preferred embodiment, the liquid has a controlled residence time in the nucleator 114. The final objective is to produce ice crystals as large as possible. If too many crystal nuclei are generated in the nucleator, this lowers the average size of the crystals later produced. Residence time of the supercooled liquid in the nucleator allows the ice crystals to begin to grow, slightly, therefore tending to produce a fewer number of larger ice nuclei, or fine crystals, rather than a larger number of smaller nuclei. Further, it has been found that if the nuclei are too small when they leave the nucleator, they can stick to the walls of the crystallizer to form ice scale. In the preferred embodiment, the residence time of the liquid in the nucleator is less than 15 minutes, but greater than one minute, although a zero or near-zero residence time is possible.

In order to avoid temperature gradients and obtain a consistent size distribution of the nuclei and fine crystals, an agitator 118 is used to flow the liquid in the nucleator over the ultrasound element 120.

Depending on the amount of nuclei growth that occurs in the nucleator, it is sometimes necessary to add additional cooling elements in the nucleator, or implement forced circulation through an additional heat exchanger, not shown. As the nuclei are allowed to grow, this preliminary crystallization process produces heat, which may be required to be removed, depending on the residence time and supercooling level.

The liquid, which is drawn out of the nucleator 114, is then pumped, see pump 123, to a crystallizer 124. The crystallizer 124 comprises a body or tank 126, a circulating pipe 128, a pump 130, for driving the liquid through the circulation pipe, and a crystallizer heat exchanger 132. This is a forced circulation implementation. As crystals grow in the liquid, the generated heat is removed through the heat exchanger 132 to maintain a constant level of supercooling, i.e, less than 1.5° C. It should be pointed out that the crystallizer's configuration is conventional, negating the need for special purpose equipment here.

In the invention, crystallization occurs at lower levels of supercooling than nucleation. Preferably, crystallization occurs at a supercooling of between 0.1 and 0.4° C., i.e., 0.1–0.4° C. below the liquid's freezing point. This low level of supercooling has a number of advantages. First, it prevents ice scaling in the crystallizer heat exchanger 132. To this end, the coolant from the refrigerative chillers 113 to the heat exchanger 132 is preferably kept only a few degrees below the liquid's freezing point, usually 2–3° C. below the freezing point. The low supercooling also promotes the slow formation of the crystals. This is important because the growth of large crystals with very high purity is desirable.

If high levels of supercooling are used in the crystallizer, the crystallization tends to be limited by mass transfer properties. As a result, the crystal's growth tends to be very dendritic in nature. This results in high levels of inclusions and entrapments of the mother liquor in and between the crystals. This substantially lowers the purity.

In the preferred embodiment, the crystals grow to sizes of between 0.5 and 2 millimeters (mm). In most implementations, this can be achieved with resident times of greater than thirty minutes in the crystallizer, but typically less than two hours.

In other implementations, it is possible to combine the functions of nucleator and crystallizer into a single device. In any case, the critical feature of the invention is that nucleation and crystal growth occur at different temperatures. Crystal growth occurs at a lower supercooling, than nucleation, to avoid entrapments and inclusions of the mother liquor in the crystals.

A slurry of crystals and mother liquor are pumped, using pump 133, from the body 126 of the crystallizer 124 and passed to a separator 134. This removes the mother liquor from the ice crystals. The separated crystals then pass to washer 136 where any mother liquor, which is adhering to the crystals, is washed away by a small amount of water.

The concentrate isolated by the separator 134 is carried away for further processing. The liquor from the washer 136 is sent back to the feed line and mixed with the effluent from the bleaching process. In the illustrated application, the concentrate is approximately 10% solute including AOX, other organic compounds, and electrolytes. Such further processing includes developed technology for the destruction of the organic compounds by methods such as wet oxidation or incineration. In experiments, purification factors for AOX, BOD, and chlorides of 210 to 810 have been achieved. The purification factor is defined as the ratio of the solute concentration in the mother liquor to that in the washed ice. In another sense the AOX concentration of 32 parts per million (ppm) in the effluent from the ECF bleaching plant is reduced to 0.043–0.14 ppm in the ice product.

The ice crystals from the washer 136 are passed back to precooler 110. This melts the ice to reuse the energy of cooling to precool the inflowing effluent from the bleaching process.

In the preferred embodiment, the freeze concentration system 100 is used in a closed loop paper bleaching process where the water from the washer is returned to the feed line and the melted ice in the precooler 110 is returned back to the plant to be reused as pure water.

In the preferred embodiment, an ice crystal size detector 140 is used to detect the size distribution of the ice in the crystallizer body 126. This information is passed to the controller 138, which controls ultrasonic amplifier 142. Generally, the objective is to obtain the largest ice crystals in size as possible. The ice crystals size is controlled by the intensity with which the liquid in the nucleator is irradiated or the pulse period/duty cycle. Generally, when the size of the crystals is too small, the controller 138 controls the ultrasonic amplifier 142 to irradiate the liquid in the nucleator less intensely. This has the result of creating fewer ice nuclei around which the crystals later form.

Figure 2:
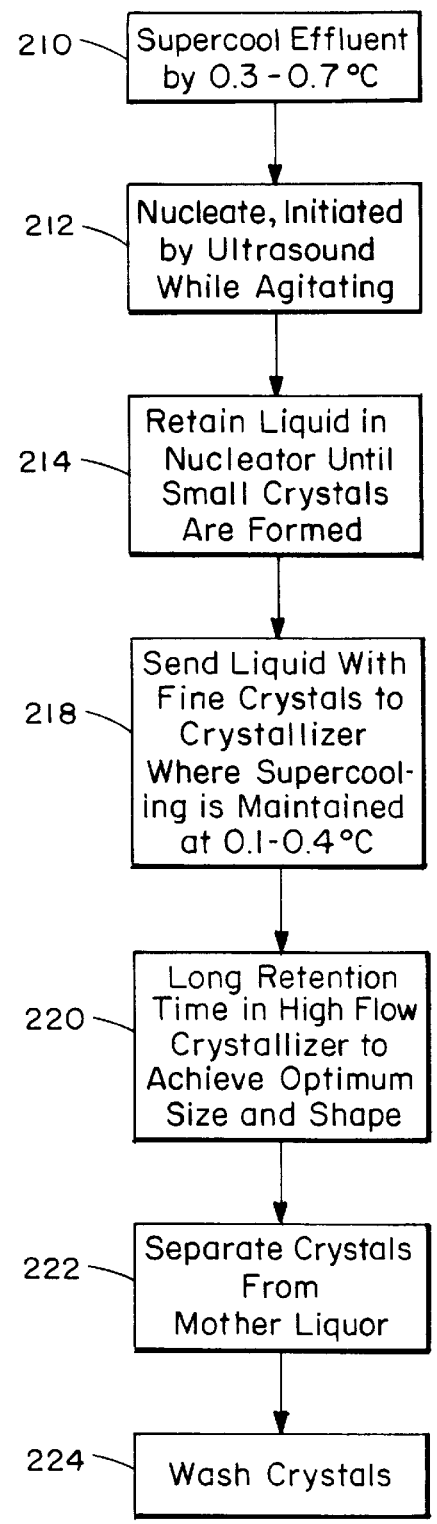
FIG. 2 is a flow diagram illustrating the inventive freeze concentration process.

FIG. 2 is a process diagram illustrating the invention.

In step 210, the feed effluent solution is precooled by washed ice and then supercooled to between 0.3 and 0.7° C. The nucleator, which may be a jacketed vessel or a tank with an external cooler to keep the suitable nucleation temperature, holds the effluent while it is irradiated with ultrasonic energy under preferably high agitation in step 212. In step 214, the effluent preferably has a substantial residence time in the nucleator to allow small crystals to form. The liquid with the fine ice crystals is then sent to the crystallizer while the level of supercooling drops to 0.1 to 0.4° C., in step 218.

In step 220, the liquid and forming ice crystals are preferably circulated in a forced circulated, surface cooled, or another type of industrial crystallizer. The retention time is preferably long to promote large ice crystal formation at low supercooling. Then in step 222, the crystals are separated from the mother liquor and washed in step 224. The wash water can be recycled water from the Kraft mill, and after washing, the wash liquor back to the feed line. The washed ice is then used to precool the feed, and the water from the melted ice is recycled to the plant.

While this invention has been particularly shown and described with references to preferred embodiments thereof, it will be understood by those skilled in the art that various changes in form and details may be made therein without departing from the spirit and scope of the invention as defined by the appended claims. For example, those skilled in the art will recognize or be able to ascertain using no more than routine experimentation, many equivalents to the specific embodiments of the invention described specifically herein. Such equivalents are intended to be encompassed in the scope of the claims.

What is claimed is:

1. A method of freeze concentration, comprising
   supercooling a liquid;
   ultrasonically irradiating the supercooled liquid in a nucleator;
   flowing the liquid from the nucleator into a crystallizer; and
   separating frozen particles in the crystallizer from mother liquor.

2. A method as described in claim 1, wherein the step of supercooling the liquid comprises cooling industrial effluent.

3. A method as described in claim 1, wherein the step of supercooling the liquid comprises cooling effluent from a paper bleaching process.

4. A method as described in claim 1, wherein liquid in the nucleator is supercooled to less than 3° C.

5. A method as described in claim 1, wherein liquid in the nucleator is supercooled to between 0.3 and 0.7° C.

6. A method as described in claim 1, wherein the step of ultrasonically irradiating the supercooled liquid comprises exposing the supercooled liquid to pulses of ultrasound.

7. A method as described in claim 1, wherein the step of ultrasonically irradiating the supercooled liquid comprises exposing the supercooled liquid to pulses of ultrasound, the time between pulses being related to the retention time in the nucleator.

8. A method as described in claim 1, wherein the step of ultrasonically irradiating the supercooled liquid comprises exposing the supercooled liquid to pulses of ultrasound having a frequency of approximately 20 k to 23 k Hertz.

9. A method as described in claim 1, wherein the supercooled liquid has a residence time in the nucleator of greater than one minute.

10. A method as described in claim 1, further comprising circulating the liquid in the crystallizer between a heat exchanger and crystallizer tank.

11. A method as described in claim 1, wherein the supercooled liquid has residence in the crystallizer necessary for the ice crystals to grow to about 0.5 mm or greater.

12. A method as described in claim 1, wherein the step of separating the frozen particles from the mother liquor comprises drawing a slurry from the crystallizer tank.

13. A method as described in claim 1, further comprising washing the frozen particles in the slurry.

14. A method as described in claim 13, further comprising using ice separated from the slurry to precool the liquid to the nucleator.

15. A method as described in claim 13, wherein concentrate separated from the ice in the slurry is captured for further processing.

16. A method as described in claim 1, further comprising using lower supercooling in the crystallizer than in the nucleator.

17. A method of freeze concentration, comprising supercooling a liquid;

ultrasonically irradiating the supercooled liquid to initiate nucleation;

crystalizing the nucleated liquid at lower supercooling than at which the nucleation occurred; and separating frozen particles of the liquid from remaining liquid.

18. A system for freeze concentration of industrial effluent, the system comprising a cooling unit for supercooling a liquid;

a nucleator in which a supercooled liquid is exposed to ultrasound to induce nucleation;

a crystallizer that receives liquid from the nucleator for crystallization; and a separation device for isolating frozen particles in the liquid from the crystallizer.

19. A system as described in claim 18, wherein the crystallizer comprises:

a crystallization tank for containing the liquid;

a heat exchanger for controlling a temperature of the liquid in the crystallization tank; and a circulating pump that circulates the liquid between the crystallization tank and the heat exchanger.

20. A system as described in claim 18, wherein liquid in the nucleator is supercooled to less than 3° C.

21. A system as described in claim 18, wherein liquid in the nucleator is supercooled to between 0.3 and 0.7° C.

22. A system as described in claim 18, further comprising an ultrasonic energy generator, which generates pulses of ultrasound.

23. A system as described in claim 22, further comprising a controller that controls the ultrasonic energy generator in response to the size of ice crystals in the crystallizer.

* * * * *